Feb. 4, 1930.  C. L. HEISLER  1,746,155
BAKING APPARATUS
Filed April 22, 1926  3 Sheets-Sheet 1

Inventor:
Charles L. Heisler,
by
His Attorney.

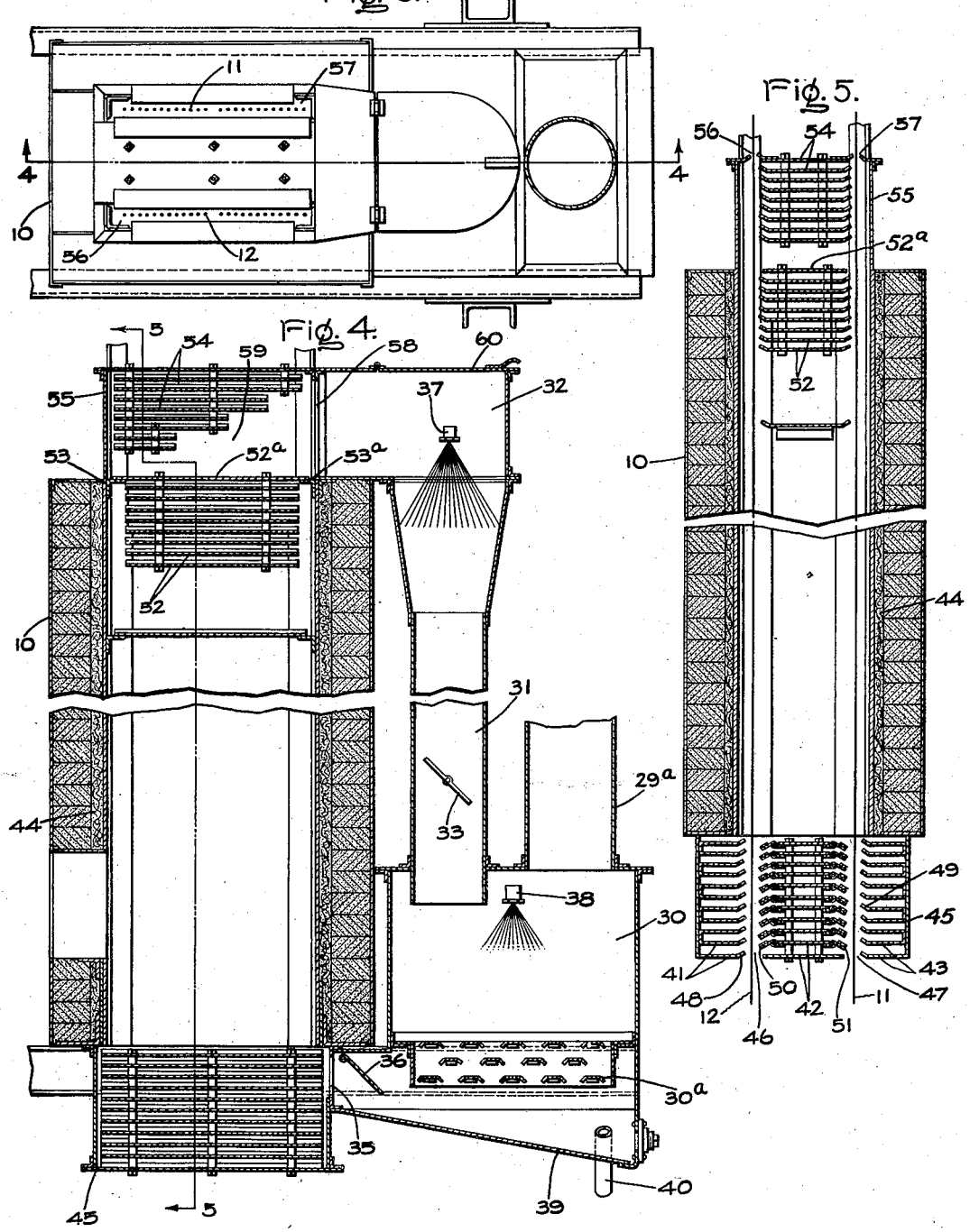

Feb. 4, 1930.  C. L. HEISLER  1,746,155
BAKING APPARATUS
Filed April 22, 1926   3 Sheets-Sheet 3
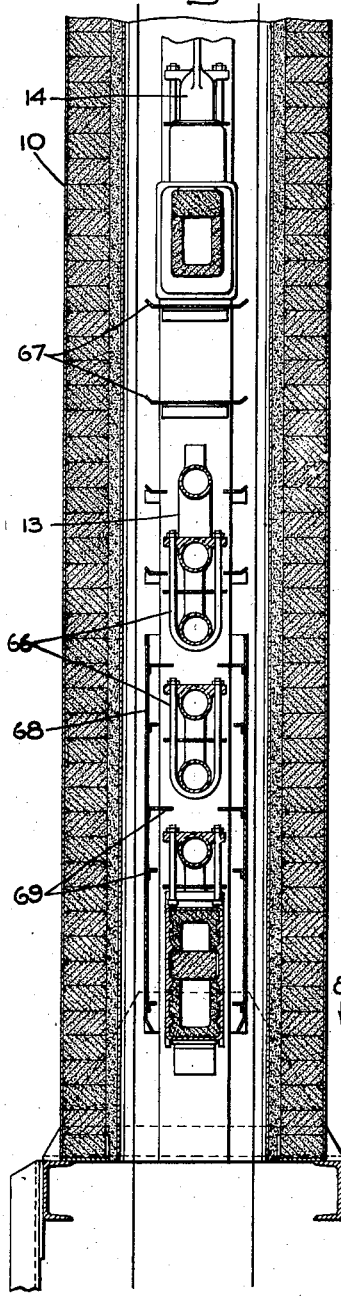
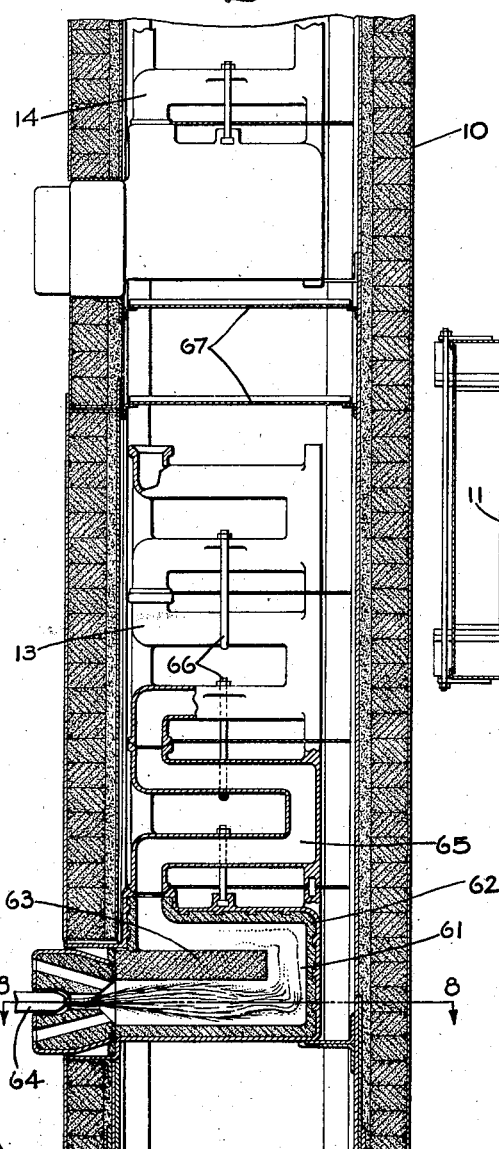
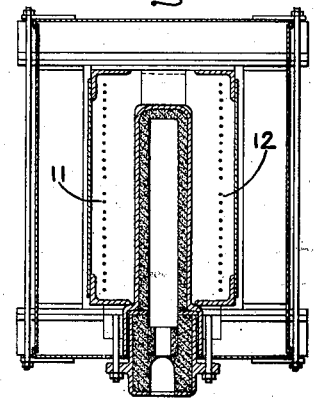
Inventor:
Charles L. Heisler,
by
His Attorney.

Patented Feb. 4, 1930

1,746,155

UNITED STATES PATENT OFFICE

CHARLES L. HEISLER, OF SCHENECTADY, NEW YORK, ASSIGNOR TO GENERAL ELECTRIC COMPANY, A CORPORATION OF NEW YORK

BAKING APPARATUS

Application filed April 22, 1926. Serial No. 103,979.

My invention relates to baking apparatus and has for its object the provision of means whereby a substantially uniform temperature may be maintained throughout the baking chamber.

More specifically my invention relates to apparatus for applying and baking one or more coats of varnish or enamel on material which is passed continuously through the apparatus. My invention is applicable to the making of varnished cambric and the like, and is especially applicable to the enamelling of wire, as well as to various other processes in which the treated material is passed through a heating chamber. In such apparatus it is very difficult, if not impossible, to close the heating chamber or oven completely since there is of necessity a certain amount of leakage at the points where the treated material enters and leaves the chamber by reason of which a variable and uncontrollable amount of cold air enters the chamber. As a result there are continual changes in the temperature of the baking chamber, which condition is very disadvantageous from the point of view of both the quality of the product and the quantity produced.

In carrying out my invention I control the leakage of cold air into the oven so as to maintain substantially uniform temperature conditions. In carrying out my invention in one form I withdraw gases at the points where the treated material enters and leaves the oven. Cold air is prevented to a large extent from entering the interior of the oven from the bottom by reason of the withdrawal of gases from the bottom.

Figure 1:
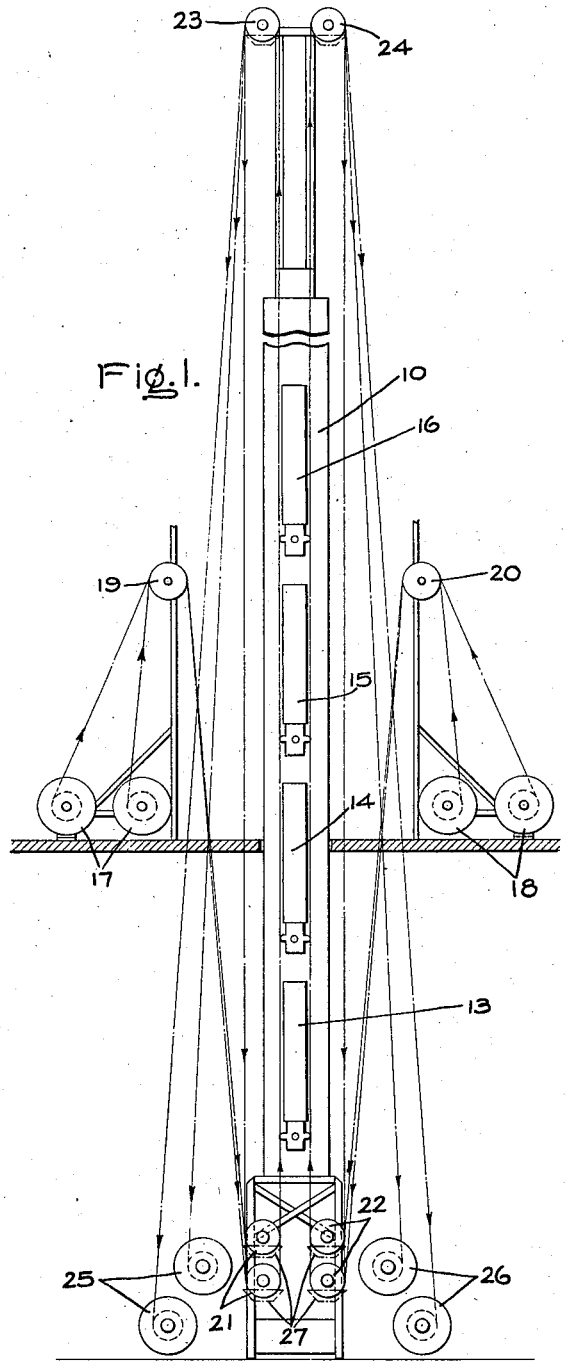
Figure 2:
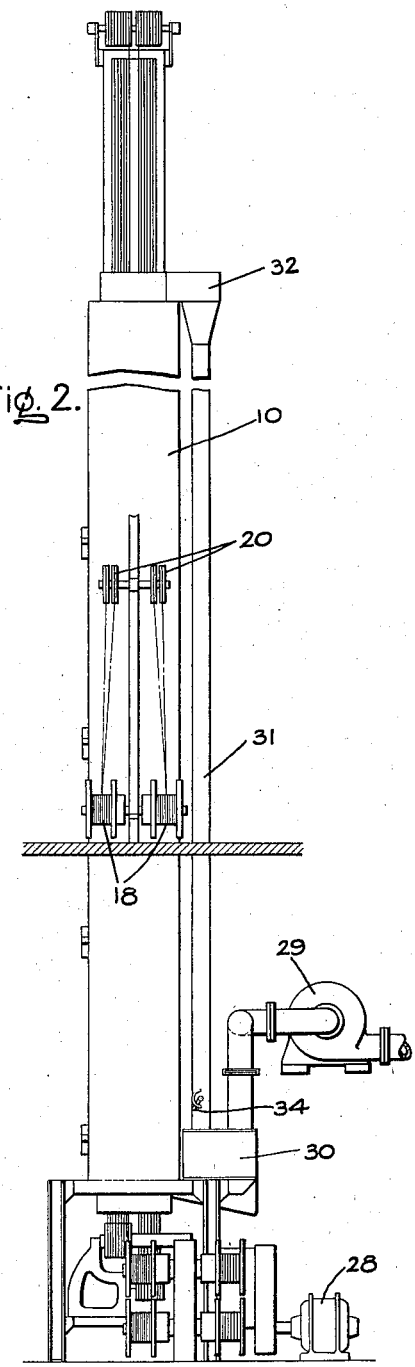

For a more complete understanding of my invention reference should be had to the accompanying drawings in which Fig. 1 is a simplified side elevation view of baking apparatus embodying my invention; Fig. 2 is a simplified end elevation view of the apparatus shown in Fig. 1; Fig. 3 is an enlarged fragmentary plan view; Fig. 4 is an enlarged, fragmentary vertical sectional view with the heating means removed taken along the line 4—4 of Fig. 3, looking in the direction of the arrows; Fig. 5 is a sectional view along the line 5—5 of Fig. 4 looking in the direction of the arrows; Figs. 6 and 7 are vertical sectional views showing the heating means; while Fig. 8 is a sectional view along the line 8—8 of Fig. 7 looking in the direction of the arrows.

Referring to the drawing, I have shown my invention in one form as applied to the enamelling of wire, although it obviously has various other applications. As shown in Figs. 1 and 2, I have provided an elongated oven 10 which is set on end, i. e., with its greatest dimension substantially vertical. The wire to be enamelled is passed from supply spools or reels through the oven lengthwise in a vertical direction, and after being enamelled is again wound upon spools. Preferably it is passed back and forth through the oven a number of times, it being given a coating of enamel before each baking pass, in the manner shown for example in Patent No. 695,127 to Thomson et al. In the arrangement shown each wire is passed through the oven six times and the oven is of sufficient width to accommodate four wires so that there are 24 wires running through the oven in parallel spaced relation. There are two groups, 11 and 12, of twenty-four wires each (Fig. 3), these two groups being on opposite sides of the oven. Heating devices 13, 14, 15 and 16 are provided at suitable intervals along the length or height of the oven between the two groups of wires.

The wires are supplied to the oven from two groups 17 and 18 of four spools each on opposite sides of the oven, and disposed preferably above the bottom, for example, on a second working floor. From the spools the wires pass over groups of idler sheaves 19 and 20 and thence downward and under groups of idler sheaves 21 and 22 beneath the lower end of the oven. From the sheaves 21 and 22 the wires pass upward into the interior of the oven and at the top pass over groups of sheaves 23 and 24 and thence downward and around the sheaves 21 and 22. It will be understood that each wire is provided with separate spools or sheaves, as the case may be, in each of the groups 17–24 inclusive, each wire passing upward through the oven, downward, and then upward again through the oven until it has made six journeys through the oven. At the completion of their journeys through the oven, the wires pass downward and are wound up on groups of spools 25 and 26, each group consisting of four spools. The sheaves of the groups 21 and 22 run in tanks 27 containing a sufficient quantity of enamel, varnish, or other material which is to be applied to the wire so that the spools are partially immersed, whereby, as the wires pass around the spools, they are given a fresh coating of enamel. Suitable wipers may be provided to regulate the thickness of the coating as desired. The wires are pulled through the oven by means of an electric motor 28 which is suitably geared to the spools of the groups 25 and 26, as well as to the spools of groups 21 and 22.

An important feature of my invention consists in the provision of means for maintaining a substantially uniform temperature throughout the length of the oven. It will be observed that the oven would naturally have the draft characteristics of a chimney, and consequently the hot air would tend to rise to the top, and as a result there would be a tendency for cold air to be drawn in at the bottom through the openings around the wires. This action would obviously result in non-uniform and variable temperature conditions in the oven. Connected with the upper and lower ends of the oven is a suction device 29 by means of which cold air and gases at the bottom of the oven and also hot gases from the interior of the oven are withdrawn, a gas pressure somewhat below atmospheric being maintained. As shown in Fig. 4, the suction device is connected by a duct 29ª and to a suction chamber 30 which for convenience in operation is placed near the lower end of the oven. This suction chamber 30 communicates through a vertical duct 31 and the chamber 32 with the upper end of the oven. A damper 33 is provided in the duct 31 by means of which the amount of air passing through the duct can be regulated. This damper may be operated by means of a handle 34 (Fig. 2). The suction chamber 30 is connected with the lower end of the oven through an aperture 35 which is provided with a damper 36.

In order to cool the hot gases which are withdrawn from the oven, water is sprayed into the upper end of the duct 31 by means of a spray nozzle 37. A second spray nozzle 38 is provided in the suction chamber 30 by means of which the gases withdrawn from the lower end of the furnace are cooled. These gases may be at a fairly high temperature when withdrawn, but they are cooled to a comparatively low temperature such as 100° F. to 200° F. The cooling water, together with the condensed materials of the gases, collects in the bottom of the chamber 30 and is directed by the inclined bottom 39 of the chamber to a drain pipe 40.

As shown in Fig. 5 the two groups of wires 11 and 12 enter the oven at the bottom thereof by passing between sets of horizontally disposed sheet metal baffle plates 41, 42 and 43, the set 42 being mounted between the two groups of wires, while the sets 41 and 43 are mounted adjacent the outer sides of the two groups. These baffle plates are preferably appended to the lower end of the oven proper, that is, the heated portion of the oven, which portion is surrounded by a jacket of heat insulating material 44. The groups of baffle plates 41, 42 and 43 are supported in a tight casing 45 which is secured to the lower end of the oven and opens into the interior thereof, and is provided with slots or elongated apertures 46 and 47 in its bottom through which the two groups of wires enter the oven. The suction chamber 30 communicates with the casing 45 at one side through the aperture 35 which is in the upper end of the casing 45. A series of horizontal baffles 30ª are provided near the bottom of the section chamber 30 so that gases entering through the aperture 35 must pass through the baffles 30ª to obtain access to the interior of the chamber 30. These baffles 30ª cause a thorough intermingling of the hot gases and the water from the spray 38.

It will be noted from an examination of Fig. 5 that the baffle plates 41 and 43 have their edges bent upward adjacent the groups of wires 12 and 11, respectively, as indicated by reference numerals 48 and 49. The edges of the baffle plates 42 adjacent the groups of wires are turned downward somewhat, the inclined portions in this case being flaps 50 and 51 which are hinged to the horizontal portions of the baffles. This construction is provided for the purpose of allowing obstructions in the wire, such as spliced joints, to run freely past the baffles. The upwardly turned edges of the plates 41 and 43 while allowing obstructions to pass, also facilitate the entrance of cold air, and the entrance of cold air would be further augmented if a similar arrangement were used on the control plates 42. The hinged flaps, however, are free to move to upwardly inclined positions to pass obstructions, but thereafter assume downwardly inclined positions, in which positions the entrance of cold air is obstructed. It will be observed that cold air is deflected by the upwardly inclined portions 48 and 49 against the flaps 50 and 51 which interrupt the flow of cold air into the oven.

A somewhat similar arrangement of baffles is provided at the top of the oven. A series of baffles 52 consisting of horizontally arranged plates, preferably of sheet metal, are placed between the two groups of wires. These baffles are hung from a supporting plate 52ª which rests on supports formed by angle irons 53 and 53ª in the upper end of the heating chamber. It will be observed that the baffles 52 are spaced from the oven wall at each end, as well as at the sides, to provide room for the two groups of wires. This spacing provides for the escape of smoke and other gases which it is desired to remove from the oven. A second group of horizontally arranged baffle plates 54 is provided just outside the upper end of the oven. These plates are enclosed in a casing or cap 55 which rests over the upper end of the oven. Elongated apertures 56 and 57 are provided in the top of the casing 55 through which the two groups of wires pass. The casing 55 communicates at one side through an aperture 58 with the chamber 32. It will be observed that the baffles 54 are arranged in pairs as regards their length, the upper pair being the longest, while the three lower pairs become successively shorter in the downward direction. The ends of the baffles opposite the outlet opening 58 are substantially even so that as a result of the shortening of the lower pairs a space 59 is provided between the two sets 50 and 54 through which the hot gases and smoke from the oven are withdrawn. A door 60 is provided in the upper end of the chamber 32 through which access can be had to the interior of the chamber 32 for cleaning purposes.

While any suitable heating means may be used for the oven, I have shown gas fired heaters. As previously noted a plurality of separate heaters 13-16, inclusive, are provided which are spaced vertically along the height of the oven. At its lower end each heater is provided with a combustion chamber 61 which is lined with heat refractory material 62 and provided with a horizontal baffle wall 63. A gas nozzle 64 is mounted in an aperture provided for it in the mouth of the chamber. The hot gases from the combustion chamber pass upward through a duct 65 which leads through successive horizontal and vertical connecting ducts back and forth from side to side of the oven. This duct may be formed of a plurality of cast sections held together by suitable bolts 66. At its upper end the duct 65 of each heater opens into the interior of the oven.

In order to obstruct the upward flow of the hot gases to the upper end of the oven, horizontal baffle plates 67 are provided at intervals along the height of the oven. Adjacent the heaters 13 to 16, inclusive, these baffles are provided with suitable apertures for the heaters. The lowermost heater 13 is enclosed in a casing 68, open at the top and bottom, and provided with spaced internal horizontal baffles 69. The heater 13 is operated at a somewhat higher temperature than the upper heaters in order to heat quickly any relatively small amount of cold air which may enter at the bottom of the oven, and the casing 68 is provided around the heater 13 to protect the wires from direct radiation from the heater. As shown in the drawing, the baffles 69 around this lower heater 13 are more closely spaced than the upper baffles 67 so as to offer a greater impediment to the upward flow of the hot gases.

In the operation of the oven the dampers 33 and 36 are so regulated that a substantially uniform temperature is maintained throughout the height of the oven. The damper 33 will be so regulated that no smoke will escape from the oven top, the smoke being entirely withdrawn through the duct 31. At the bottom, hot gases will also be withdrawn to some extent so as to draw the hot gases downward to the lower end of the oven against their tendency to rise and thereby maintain a uniform temperature. The damper 36 will be adjusted to maintain a substantially uniform temperature which will be determined by means of a plurality of temperature indicators (not shown) such as thermocouples spaced at intervals along the height of the oven. Any suitable temperature may be obtained, although I have found that approximately 750° F. is satisfactory for certain kinds of enamel and approximately 500° F. for varnishes.

It will be observed that the suction device 29 is connected to one side of the groups of baffles 41, 42 and 43 at the bottom of the oven, and likewise to one side of the groups of baffles 54 at the top of the oven. The suction device thus freely withdraws gases from between the baffle plates. The withdrawal of gases from the bottom of the oven is a further prevention of the entrance of cold air, the entrance of cold air being also prevented, as previously noted by the baffles 41, 42 and 43 themselves. Since the suction device has access to the lower groups of baffles 41, 42 and 43 near the tops of the groups, this access being had through the opening 35, hot gases are withdrawn more freely than the cold air from the exterior although a certain amount of cold air will be withdrawn with the hot gases from the oven.

By suitably regulating the damper 36, the damper 33 having been adjusted to prevent the escape of smoke from the top of the oven, a very uniform temperature can be maintained throughout the length of the oven. I have found that in an oven approximately forty feet in height, a temperature difference between the top and bottom of less than 5° F. can be successfully maintained. Furthermore, the escape of gases into the work room is prevented so that the operators are free from the annoyance and injurious effects of such gases. For uniform temperature and baking conditions, the gas pressure in the oven may be two or more inches of water below atmospheric pressure.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. The combination with a vertically arranged oven having openings at the top and bottom to provide for the ingress and egress of material to be heated, of fuel fired heating means for said oven, the outlet of said fuel fired heating means opening into said oven, suction means connected to the bottom end of the oven and exhausting to the outside atmosphere for withdrawing hot gases from the bottom of said oven to counteract the tendency of the gases to rise to the top of said oven and suction means connected to the top of said oven for withdrawing smoke from said oven.

2. The combination with a vertically arranged elongated oven, of means for passing the material to be baked continuously through said oven in a vertical direction, and means for withdrawing gases from said oven at the points where said material enters and leaves said oven so as to maintain a substantially uniform temperature throughout the length of said oven.

3. The combination with an elongated vertically arranged oven, of fuel fired heating means for said oven, the outlet of said fuel fired heating means opening into said oven, means for passing the material to be baked continuously through said oven from one end to the other, suction means connected with the ends of said oven, and means for independently regulating the suction at said ends so as to draw off the smoke from the top of the oven and withdraw hot gases from the bottom of said oven.

4. The combination with an elongated oven, means for passing the material to be heated lengthwise through said oven, baffles in the ends of said oven adjacent the points where the material enters and leaves the oven, suction means communicating with said oven at regions adjacent said baffles, and means for independently regulating the suction applied to the ends of said oven.

5. The combination with a vertically arranged elongated oven, of heating means therefor, means for passing the material to be heated continuously through said oven from one end to the other, means for withdrawing hot gases from the top and bottom of said oven, means including a set of baffle plates in the top of said oven for obstructing the escape of hot gases from said oven, and means including a second set of baffle plates in the bottom of said oven for obstructing the entrance of cold air to said oven.

6. The combination with an elongated vertically arranged oven, of heating means therefor, means for passing the material to be heated continuously through said oven, suction means, ducts connecting said suction means with the ends of said oven, dampers in said ducts, a baffle in the top of said oven for obstructing the escape of hot gases, and a baffle in the bottom of said oven arranged to obstruct the entrance of cold air.

7. The combination with an elongated vertically arranged oven, of heating means therefor, means for passing the material to be heated continuously through said oven, suction means, connections between said suction means and the ends of said oven whereby hot gases are withdrawn from each end of the oven.

8. The combination with a vertically arranged elongated oven, of heating means therefor, means for passing the material to be heated lengthwise through said oven from one end to the other, means for withdrawing hot gases from the ends of said oven adjacent the points where the material enters and leaves said oven, means for independently regulating the withdrawal of hot gases from the ends of said oven, a plurality of baffle plates in the top of said oven arranged to obstruct the withdrawal of hot gases, and a plurality of baffle plates in the bottom of said oven arranged to obstruct the entrance of cold air into said oven.

9. In baking apparatus, the combination with a vertically arranged elongated oven, of a plurality of fuel fired heating devices spaced along the height of said oven, each of said heaters comprising a combustion chamber and a duct extending upward and back and forth across said oven, said duct opening at its upper end into said oven.

In witness whereof, I have hereunto set my hand this 21st day of April, 1926.

CHARLES L. HEISLER.